July 22, 1958  J. G. INGRES  2,844,003
EMERGENCY POWER HOOK-UP FOR BOOSTER BRAKE MECHANISMS
Filed Aug. 31, 1953
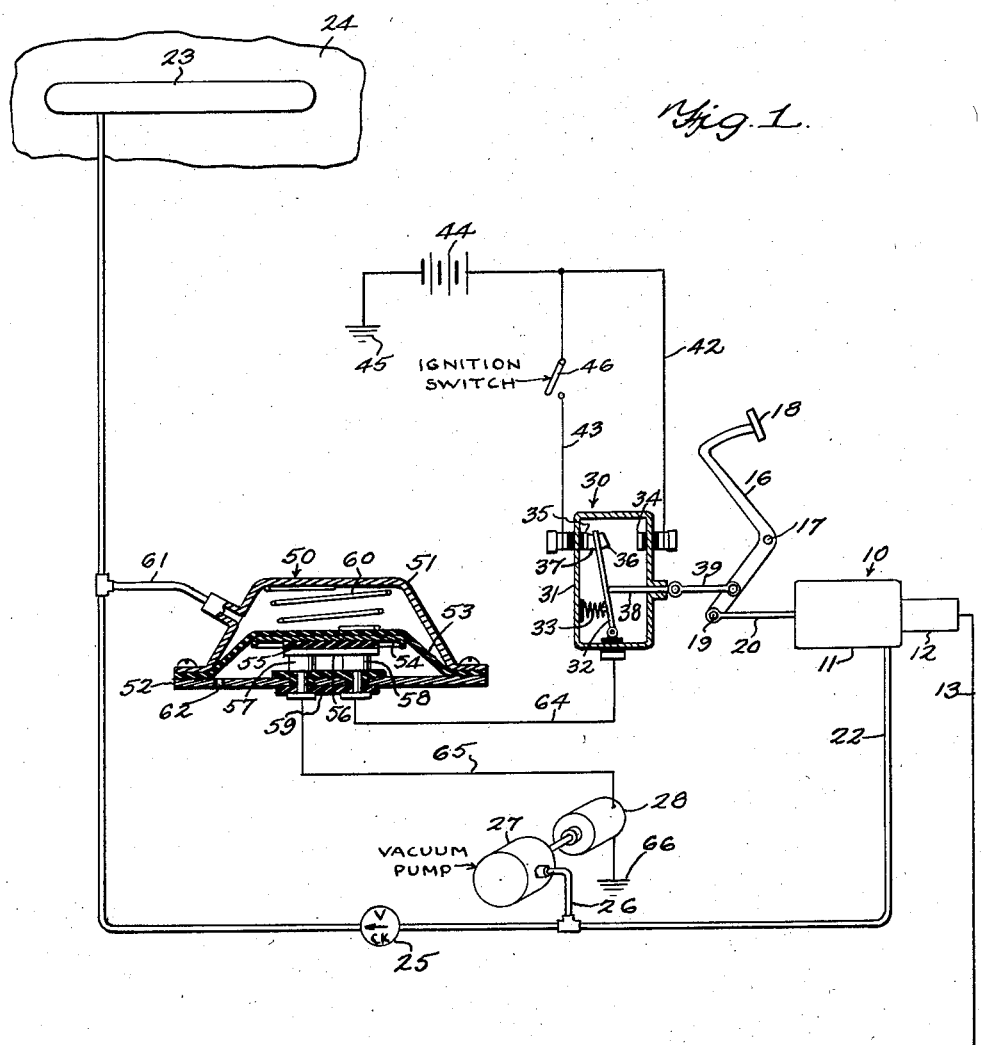
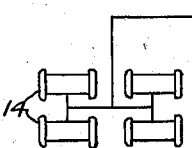
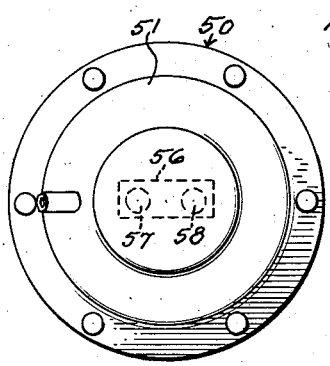
INVENTOR
JEANNOT G. INGRES
BY John X. Phillips
ATTORNEY

United States Patent Office 2,844,003
Patented July 22, 1958

2,844,003

EMERGENCY POWER HOOK-UP FOR BOOSTER BRAKE MECHANISMS

Jeannot G. Ingres, Dearborn, Mich., assignor to Kelsey-Hayes Company, a corporation of Delaware Application August 31, 1953, Serial No. 377,462

6 Claims. (Cl. 60—60)

This invention relates to an emergency power hook-up for booster brake mechanisms, and particularly such mechanisms which are operated by differential fluid pressure motors.

It is the common practice to provide booster brake mechanisms wherein a portion of the braking force is generated by pressure of the foot on the pedal while the remainder of the power is generated by a differential fluid pressure operated motor. These booster brake mechanisms are so constructed that in the event of a failure of power in the source, for example the vacuum of the intake manifold, it is possible for the operator to apply the brakes by foot pressure on the pedal. In the absence of the assisting power of the motor, however, it requires substantial force on the brake pedal to apply the brakes and deceleration of the vehicle necessarily takes place much more slowly than when the booster motor is operating.

An important object of the present invention is to provide an emergency source of power for the motor of the booster mechanism in the event the source of power fails, or in the event the operator of the vehicle drifts away from the curb and attempts to apply the brakes without having started the motor of the vehicle.

A further object is to provide such a device particularly for use with vacuum operated booster motors wherein an auxiliary electric motor is employed for driving an auxiliary vacuum pump which automatically comes into operation to provide power for the booster motor in the event such power is not available in the usual source.

A further object is to provide an emergency power hook-up of the character referred to wherein the motor for driving the vacuum pump is subject to control by a small pressure-responsive motor operated in accordance with pressures in the source, the vacuum motor embodying a switch in series with the electric motor and operative for energizing such motor if no fluid pressure is present in the source utilized ordinarily for operating the booster motor.

A further object is to provide such a hook-up particularly adapted for use with vacuum operated booster motors and wherein the source of vacuum is the intake manifold of the vehicle engine, the electric motor for the auxiliary vacuum pump having a circuit including a switch biased to closed position and held in open position to deenergize the electric motor when vacuum is present in the intake manifold.

A further object is to provide such a system having a novel control switch mechanism mechanically connected to the brake pedal to energize the driving motor for the vacuum pump whenever the brake pedal is depressed, if no fluid pressure is present in the conventional source, such switch being inoperative when the brake pedal is released and no fluid pressure is present in the source, thereby preventing the constant energization of the motor for driving the auxiliary vacuum pump.

A further object is to provide a system of this character wherein the control switch associated with the brake pedal is provided with a pair of contacts connected to parallel wires leading from one terminal of the vehicle battery, one contact being engageable by the switch only when the brake pedal is depressed and the other being in series with the ignition switch and being operative when the brake pedal is released whereby, if the ignition switch of the engine is closed a circuit will be completed through the second contact referred to to energize the driving motor for the vacuum pump, but wherein a pressure-responsive switch renders the circuit through the second contact referred to inoperative if the vehicle engine starts operating.

Other objects and advantages of the invention will become apparent during the course of the following description.

In the drawing I have shown one embodiment of the invention. In this showing—

Figure 1 is a schematic view of the entire system, parts being structurally shown in section, and Figure 2 is a plan view of the fluid pressure switch device.

Referring to Figure 1, the numeral 10 designates a booster brake mechanism as a whole shown in the present instance as comprising a fluid pressure operated motor 11 the pressure-responsive unit of which (not shown) operates in a conventional master cylinder 12 ordinarily used with a device of this character. Fluid is displaced from the master cylinder in the usual way through pipe lines 13 leading to the usual vehicle brake cylinders 14.

The vehicle is provided with the usual brake pedal lever 16 pivotally supported as at 17 and provided with a pedal pad 18 at its upper end. The lower end of the pedal lever is pivotally connected as at 19 to a push rod 20 extending into the vacuum motor 11 to operate the valve mechanism thereof when pressure is applied to the pedal pad 18 in the usual manner.

The motor 11 is connected to one end of a pipe line 22 the other end of which is tapped into the intake manifold 23 of the vehicle engine 24. Intermediate the motor 11 and intake manifold 23 the pipe line 22 is provided with a check valve 25 opening toward the intake manifold for the exhaustion of air from the vacuum motor 11 into the intake manifold whenever vacuum is present in the latter. Upon a failure of vacuum in the manifold 23, for example when the vehicle engine is not running, the check valve 25 will close.

Between the check valve 25 and vacuum motor 11, a branch pipe 26 is tapped into the pipe line 22 and leads to a vacuum pump 27 driven by an electric motor 28. When no vacuum is present in the intake manifold, the check valve 25 closes and the vacuum pump 27 operates to evacuate the pipe line 22 and thus supply vacuum to the motor 11.

A switch device 30 is associated with the brake pedal 16. This device comprises a casing 31 in which is arranged a pivoted switch arm 32, as shown in Figure 1, and this switch arm is biased toward the right by a spring 33.

The casing 31 carries a pair of contacts 34 and 35 adjacent opposite sides thereof, suitably insulated from the casing 31, as will be apparent. The switch arm 32 carries at its upper end a pair of contacts 36 and 37, respectively engageable with the contacts 34 and 35.

An operating rod 38 is slidable into the casing 31 and engages the switch arm 32. The rod 38 is connected to the pedal lever below the pivot 17 thereof by a suitable link 39. The brake pedal lever 16 is shown in its normal released position, in which case the lower arm of the pedal lever 16 is in its extreme left hand position as viewed in Figure 1, the switch arm 32 under such conditions being moved against its biasing spring 33 to maintain the contact 37 in engagement with the contact 35.

The contacts 34 and 35 are respectively connected by parallel wires 42 and 43 to the vehicle battery 44, one terminal of which is grounded as at 45. The vehicle ignition switch 46 controls the flow of current through the wire 43, and obviously no current flows through this wire except when the ignition switch 46 is closed, as further referred to below.

A vacuum-responsive switch device in the form of a small motor 50, controls under certain conditions the flow of current to the motor 28. The device 50 comprises an inverted cup-shaped upper casing section 51 and a preferably flat lower casing section 52 between the peripheral portions of which is clamped a diaphragm 53. This diaphragm is secured to a plate 54 beneath which is a layer of insulation 55 to the lower side of which is fixed a contact plate 56.

Spaced contacts 57 and 58 are carried by the lower casing section 52 and are insulated therefrom as at 59. These contacts are engageable with the plate 56, and the plate 56 is biased downwardly by a spring 60 within the casing section 51. This casing section is connected by a pipe 61 to the pipe line 22 between the check valve 25 and the intake manifold 23. It will be apparent that whenever vacuum is present in the device 50 above the diaphragm 53, the plate 56 will be held out of engagement with contacts 57 and 58. The space beneath the diaphragm 53 is vented to the atmosphere as at 62 to render the vacuum above the diaphragm effective for generating the necessary differential pressure under normal operating conditions to move the diaphragm upwardly against the tension of the spring 60. The contact 58 is connected to the switch arm 32 by a wire 64. The contact 57 is connected by a wire 65 to the motor 28, the second terminal of the motor being grounded at 66.

Operation

Before the vehicle engine is started, all of the parts of the system will be in the positions shown in Figure 1, the contact plate 56 engaging the contacts 57 and 58, the contact 37 engaging the contact 35, the brake pedal 18 being in the released position shown and the ignition switch 46 being open. To start the vehicle, the operator will close the ignition switch 46 and start the vehicle motor in the usual manner. If the brake pedal remains in the position shown in Figure 1, the contact 37 will remain in engagement with the contact 35 and a circuit momentarily will be completed through wires 43, switch arm 32, wire 64, contacts 58 and 57 across plate 56, thence through wire 65 to the motor 28, this motor being grounded as at 66. Accordingly the motor 28 for the vacuum pump 27 will start to operate, but as soon as the vehicle engine 24 starts, vacuum will be generated in the intake manifold 23 and this vacuum will be communicated to the upper chamber of the pressure-responsive device 50, and the diaphragm 53 will move upwardly to break the circuit across contacts 57 and 58. The operator can prevent the momentary operation of the motor 28 by slightly depressing the brake pedal prior to the closing of the ignition switch 46 and the starting of the vehicle motor, such slight depression of the brake pedal breaking the engagement of the contacts 35 and 37.

In the normal functioning of the vehicle, it will be apparent from the foregoing that so long as the vehicle engine 24 is running with the ignition switch 46 closed, the circuit through the motor 28 will be broken by upward movement of the plate 56 out of engagement with the contacts 57 and 58, and no current will flow through the motor 28 to either of the contacts of the switch device 30.

Assuming for some reason that the engine should stall, or some other emergency should occur such as the breaking of the line 22 at the intake manifold, and assuming that the switch 46 is closed and the engine running, vacuum in the line between the check valve 25 and the intake manifold will no longer exist and the same is true of pressure in the upper casing of the device 50. With the ignition switch 46 closed, the spring 60 will then move the diaphragm 53 downwardly to engage the plate 56 with the contacts 57 and 58 to close the circuit through the switch contacts 35 and 37 and through the motor 28 and thus start the operation of the vacuum pump 27. The check valve 25 will be closed under such conditions and air will be evacuated from the line 22 and from the chamber of the vacuum motor 10 with which such pipe line is connected. Therefore, whenever the operator desires to apply the brakes, the pedal 18 will be depressed in the usual manner and the booster motor will function in accordance with conventional practice, the only difference being that an emergency source of vacuum is provided. Thus the necessity for the operator's having to exert greater force on the brake pedal with a resultant slower deceleration of the motor vehicle is eliminated.

Assuming that in starting the vehicle, the operator is parked by the curb on a down slope, he may, as is frequently done, release the brakes of the vehicle and drift away from the curb without closing the ignition switch. If it then becomes necessary for him to brake the vehicle, with the ignition switch 46 thus opened, he will depress the brake pedal 18 in the usual manner. Movement of the lower end of the brake lever toward the right will pull the rod 38 away from the switch arm 32 and the spring 33 will move the switch arm into engagement with the contact 34, thus establishing a circuit through the electric motor 28 through wire 42, contacts 34 and 36, and thence through the remainder of the circuit described above. Under such conditions, the motor 24 of the vehicle will not be running, and there will be no vacuum in the end of the pipe line adjacent the manifold 23. The check valve 25 under such conditions will be closed and the operation of the vacuum pump 27 will quickly evacuate air from the pipe line 22 leading to the vacuum motor, and will also evacuate the chamber of such motor to which the pipe line 22 is connected. Accordingly vacuum conditions will be quickly established for the stopping of the vehicle without undue force against the brake pedal pad 18.

From the foregoing it will be apparent that the present construction provides a highly effective automatic power hook-up for vacuum or other fluid pressure operated booster motors. The contact 37 normally engages the contact 35, but unless the ignition switch is closed, no current will flow through the motor 28. The contacts 35 and 37 therefore provide means for building up a vacuum for the operation of the booster motor prior to depression of the brake pedal if the ignition switch is closed and if for some reason the vehicle engine is not operating. At the same time, the arrangement shown prevents a needless drain on the battery, the motor 28 coming into operation only when an emergency source of power for the vacuum booster is necessary. At the same time it will be apparent that the parallel wires 42 and 43 provide for operation of the pump 27 before the brake pedal is depressed, under the conditions referred to above, while the contact 34 connected to wire 42 provides for a rapid building up of vacuum after the brake pedal is operated if the ignition switch 46 is not closed.

It is to be understood that the form of the invention illustrated and described is merely illustrative, and that the invention is defined in the appended claims.

I claim:

1. An emergency power hook-up for a vehicle booster brake mechanism wherein such mechanism has a fluid pressure operated booster motor, a brake pedal for controlling such motor and a pipe line connected between the booster motor and a normal source of pressure differential; said hook-up comprising an emergency pressure fluid pump adapted for connection to said pipe line, an electric motor for driving said pump, and means controlling said electric motor, said means comprising a differential pressure-responsive device communicating with said source and including a switch biased to closed position to energize said electric motor, said fluid pressure responsive device being responsive to pressure in said source to hold said switch open when such pressure is present, a second switch in series with said first mentioned switch and arranged to be closed by the brake pedal when the latter is released, and ignition switch means connected in series with said second named switch.

2. An emergency power hook-up for a vehicle booster brake mechanism wherein such mechanism comprises a fluid pressure operated motor, a brake pedal for controlling such motor, a fluid line connecting said motor to a normal source of pressure differential, and a check valve in such line, said hook-up comprising a fluid pressure pump connected to said line between said check valve and said booster motor, an electric motor driving said pump, a pair of switches in series with said motor, one of said switches being biased to closed position and being pressure-responsive in accordance with pressure in said normal source to be maintained open when such pressure is present, the other switch comprising a switch arm mechanically connected to the brake pedal and engageable with either of a pair of contacts connected in parallel circuits leading to one terminal of a source of electrical power, said switch arm being biased for movement into engagement with one of said contacts to move into engagement therewith upon depression of the brake pedal, said brake pedal normally maintaining said switch arm in engagement with the other contact, and ignition switch means connected in series between the other contact and said one terminal of said source of electrical power.

3. An emergency power hook-up for a vehicle booster brake mechanism wherein such mechanism comprises a fluid pressure operated motor, a brake pedal for controlling such motor, a fluid line connecting said motor to a normal source of pressure differential, and a check valve in such line, said hook-up comprising a fluid pressure pump connected to said line between said check valve and said booster motor, an electric motor driving said pump, and a pair of switches in series with said motor, one of said switches being provided with a pressure responsive member, a casing surrounding such member and divided thereby into a pair of chambers one of which communicates with said fluid line between said check valve and said source, and means biasing said one switch to closed position to move to such position upon a failure of pressure in said source, the other of said switches comprising a switch arm mechanically connected to the brake pedal to be operated thereby, a pair of contacts engageable by said switch arm, said contacts being connected to parallel wires leading to an electrical power source, one of such wires being in series with the vehicle ignition switch and the brake pedal normally holding said switch arm in engagement with the contact associated with said one wire, and means biasing said switch arm into engagement with the other contact upon depression of the brake pedal.

4. In combination with a vehicle booster brake mechanism comprising a differential fluid pressure operated motor, a pedal for controlling said motor, a source of pressure differential, a pipe line connected between said booster motor and said pressure source, a check valve in said line; a fluid pressure pump connected to said pipe line between said check valve and said booster motor, an electric motor for driving said pump, and control means for said electric motor comprising a pressure responsive switch biased to closed position and subject to pressures in said pipe line between said check valve and said pressure source to be maintained open when pressure is present in such source, said control means further comprising a second switch including a switch arm connected in series with said first switch, a pair of contacts engageable by said switch arm, means biasing said switch arm into engagement with one of said contacts, a connection between said switch arm and said brake pedal normally maintaining said switch in engagement with the other of said contacts, and parallel wires connected between said contacts and a source of electrical power, the vehicle ignition switch being connected in the parallel wire leading to said other contact.

5. In combination with a vehicle booster brake mechanism comprising a booster motor, a brake pedal for controlling such motor, a vehicle engine having an intake manifold, a pipe line connecting said booster motor to said manifold, and an ignition switch for the vehicle engine; a vacuum pump connected to said pipe line, a check valve in said pipe line between said vacuum pump and said manifold, an electric motor for driving said pump, and electric circuit control means for said electric motor, said control means comprising a pressure responsive device having a casing, a diaphragm therein forming with said casing a pressure chamber communicating with said pipe line between said check valve and said manifold, a circuit including a switch element carried by said diaphragm, a pair of contacts engageable by said switch element, means biasing said switch element into engagement with said contacts to maintain such engagement when no vacuum is present in said manifold, a switch arm connected in series with said pair of contacts, a second pair of contacts engageable by said switch arm, means connected between said switch arm and the brake pedal for maintaining said switch arm in engagement with one contact of said second pair, means biasing said switch arm into engagement with the other contact of said second pair whereby such engagement is effected when the brake is depressed, and parallel wires connecting the contacts of said second pair to a source of electrical current, the ignition switch being arranged in the wire connecting said one contact of said second pair to said source of electrical current.

6. An emergency power hook-up for a vehicle booster brake mechanism wherein such mechanism comprises a fluid pressure operated motor, a brake pedal for controlling such motor, a fluid line connecting said motor to a normal source of pressure differential, and a check valve in such line, said hook-up comprising a fluid pressure pump connected to said line between said check valve and said booster motor, an electric motor driving said pump, a pair of switches in series with said motor, one of said switches being biased to closed position and being pressure-responsive in accordance with pressure in said normal source to be maintained open when such pressure is present, the other switch of said pair comprising a switch arm connected in series with said one switch, a pair of contacts engageable by said switch arm and connected to a source of electrical current, means connected to be controlled by the vehicle brake pedal for moving said switch arm between the contacts of said pair, said switch arm being engageable with one contact of said pair when the brake pedal is released and being movable into engagement with the other contact of said pair when the brake pedal is operated, and an ignition switch connected between said one contact of said pair and said source of electrical current.

References Cited in the file of this patent

UNITED STATES PATENTS

| | | |
|---|---|---|
| 1,856,635 | Herren | May 3, 1932 |
| 2,057,707 | Carroll | Oct. 20, 1936 |
| 2,095,833 | Rockwell | Oct. 12, 1937 |
| 2,142,514 | Jones | Jan. 3, 1939 |
| 2,204,706 | Searle | June 18, 1940 |
| 2,317,194 | Humphrey | Apr. 20, 1943 |
| 2,323,519 | Dean | July 6, 1943 |
| 2,601,757 | Horton | July 1, 1952 |
| 2,641,107 | Rappl | June 9, 1953 |